(12) United States Patent
Lee et al.

(10) Patent No.: US 7,325,430 B2
(45) Date of Patent: Feb. 5, 2008

(54) METHOD FOR LOCALLY SURFACE-MODIFYING OF ALUMINUM ALLOY SHEET TO IMPROVE FORMABILITY THEREOF

(75) Inventors: Chang-Gil Lee, Kyeongsangnam-do (KR); Sung-Joon Kim, Kyeongsangnam-do (KR); Heung-Nam Han, Seoul (KR); Kwan-Soo Chung, Seoul (KR); Sang-Joon Park, Seoul (KR)

(73) Assignee: Korea Institute of Machinery & Materials (KR)

( * ) Notice: Subject to any disclaimer, the term of this patent is extended or adjusted under 35 U.S.C. 154(b) by 0 days.

(21) Appl. No.: 11/510,988

(22) Filed: Aug. 28, 2006

(65) Prior Publication Data

US 2007/0051444 A1 Mar. 8, 2007

(30) Foreign Application Priority Data

Sep. 6, 2005 (KR) ...................... 10-2005-0082666

(51) Int. Cl.
*B21D 1/02* (2006.01)
*B23K 20/12* (2006.01)

(52) U.S. Cl. ......................... 72/112; 72/379.2; 72/17.3

(58) Field of Classification Search ................. 72/17.3, 72/31.01, 342.1, 342.94, 379.2, 379.6, 462, 72/476
See application file for complete search history.

(56) References Cited

U.S. PATENT DOCUMENTS 5,971,252 A * 10/1999 Rosen et al. ............. 228/112.1
6,230,957 B1 * 5/2001 Arbegast et al. .......... 228/112.1
6,634,199 B2 * 10/2003 Nomura et al. ................ 72/75
6,857,555 B2 * 2/2005 Ishida et al. ............. 228/112.1
7,003,997 B2 * 2/2006 Bar-Erez ....................... 72/70
7,201,811 B2 * 4/2007 Babel et al. ................ 148/535

* cited by examiner

*Primary Examiner*—Ed Tolan
(74) *Attorney, Agent, or Firm*—Cooper & Dunham LLP

(57) ABSTRACT

Disclosed herein is a method for improving the formability of an aluminum alloy sheet by locally modifying the surface of the aluminum alloy sheet. The method comprises: a sheet fixing step of fixing a sheet to be locally surface-modified; and a local surface modification step comprising adhering a probe closely to a region of the fixed sheet, which is in need of surface modification, by the application of pressure, and then rotationally moving the probe on the region at high speed. According to the method, the region of the sheet in which a fracture can occur due to the concentration of strains and stresses during the formation of the aluminum alloy sheet into a product is subjected to local surface modification so as to improve the formability of the aluminum alloy sheet compared to the parent metal, so that the aluminum alloy sheet can be easily formed into a product. If necessary, the friction coefficient of the probe can be changed by forming various shapes of fine embossments or fine protrusions on the lower surface of the probe, which comes into contact with the sheet, so that plastic flow can be changed to adjust the depth of the plastic region of the sheet, thus further improving the formability of the sheet.

3 Claims, 3 Drawing Sheets

METHOD FOR LOCALLY SURFACE-MODIFYING OF ALUMINUM ALLOY SHEET TO IMPROVE FORMABILITY THEREOF

BACKGROUND OF THE INVENTION

1. Field of the Invention

The present invention relates to a surface modification method for improving the formability of aluminum, and more particularly to a method for improving the formability of aluminum alloy sheets by locally modifying the surface of the aluminum alloy sheet.

2. Description of the Prior Art

In the near future, aluminum alloy sheets will be used as key materials in eco-friendly lightweight automobiles, including electrical automobiles and hydrogen automobiles, for various parts, including the inner and outer plates of the car bodies. In particular, work-hardening alloy sheets such as 5000 series aluminum sheets are known to be frequently used for automobiles.

Precipitation-hardening aluminum alloy sheets should be formed in a solid solution treatment condition, because it is difficult to ensure sufficient formability at the peak aging condition. For this reason, there is a very high possibility that distortion of the products will occur in an aging treatment process after forming. On the other hand, work-hardening alloys do not require thermal treatment after being formed into products, and thus distortion of the products does not occur and the effect of an additional increase in strength during the product formation process can be obtained.

However, as the shape of products is diversified, the forming conditions for the products also become increasingly severe. For this reason, in order for alloys to be widely applied to automobiles, it is required to further improve the formability of material itself regardless of the strengthening mechanism of the alloys, or to locally improve the formability of parts on which strains and stresses are concentrated during the formation of products.

SUMMARY OF THE INVENTION

Accordingly, the present invention has been made keeping in mind the above problems occurring in the prior art, and an object of the present invention is to provide a method for locally modifying the surface of an aluminum alloy sheet to improve the formability thereof, in which a round rod-shaped probe, which does not have a probe pin, which is inserted into the aluminum alloy sheet, is rotationally moved by the application of pressure on a surface of the sheet, which is expected to fracture during forming of the sheet into a product, so that the surface characteristics of the sheet are modified such that the formability of the aluminum alloy sheet can be improved.

To achieve the above object, the present invention provides a method for locally modifying the surface of an aluminum alloy sheet to improve the formability thereof, the method comprising: a sheet fixing step of fixing a sheet to be locally surface-modified; and a local surface modification step comprising bringing a high-speed rotating probe into close contact with a region of the fixed sheet, which is in need of surface modification, by applying pressure, and then moving the contacted probe on the region.

The local surface modification step comprises: a surface modification-needing region detection step of detecting a region on which strains and stresses are concentrated during the forming of the sheet into products; a probe positioning step of positioning a high-speed rotating probe on the region detected in said detection step; and a surface modification step comprising bringing the high-speed rotating probe into close contact with the surface modification-needing region and then moving the contacted probe on the region by applying pressure.

In the surface modification-needing region detection step, a region in which a fracture is likely to occur, due to the concentration of strains and stresses during forming of the sheet into a product having a geometrical structure, is selected. For example, a region forming a bending line in the formation of the sheet into a given shape can be selected as the surface modification-needing region.

In the surface modification step, plastic flow generated on the sheet surface penetrates into the sheet, and a locally surface-modified region is formed as a result of the movement of the probe.

As the probe, it is preferable to use a round rod-shaped probe, which does not have a probe pin, which is inserted into the sheet. On the lower end surface of the probe, a friction portion having fine embossments or fine protrusions can also be formed to increase the friction coefficient and thus increase the depth of the plastic region of the sheet. In other words, the depth of the plastic region can be adjusted by changing the friction coefficient of the friction portion.

Moreover, in the present invention, the sheet can also be applied such that the formability thereof can be improved by a joint formed by joining two or more sheets to each other using a surface friction welding process.

The above-described sheet is an aluminum alloy sheet, and according to the present invention, the formability of the aluminum alloy sheet is improved by performing the surface modification process, in which the high-speed rotating, round rod-shaped probe is brought into close contact with a region on which strains and stresses are concentrated during formation of the aluminum alloy sheet into a product, by the application of pressure, and then the contacted probe is rotationally moved on said region, so as to cause dynamic recrystallization and grain refinement resulting from temperature rise and plastic deformation inside of the aluminum alloy sheet at the interface between the aluminum alloy sheet and the round rod-shaped probe, such that the local region of the aluminum alloy sheet has a microstructure and mechanical properties different from those of the parent metal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

This invention will be described in further detail by way of example with reference to the accompanying drawings.

Figure 1:
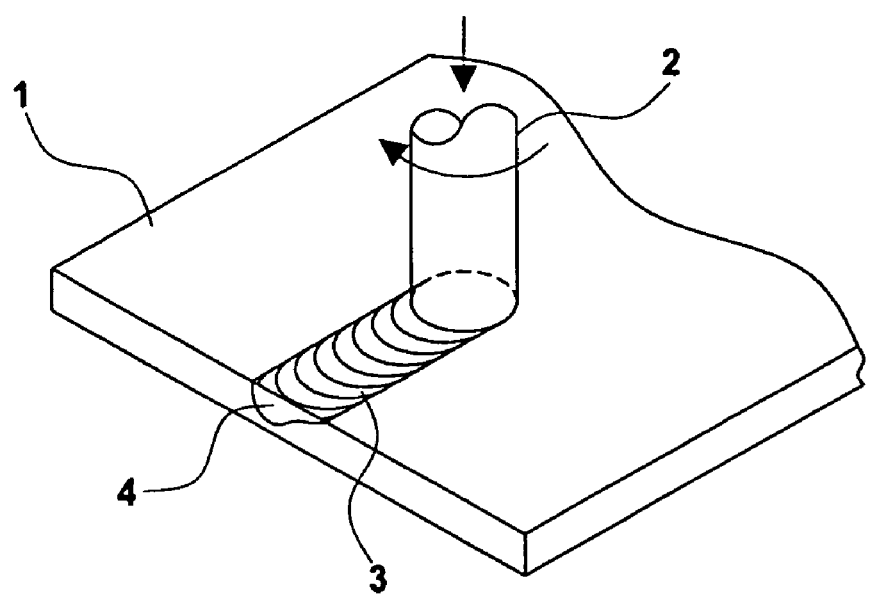
FIG. 1 shows a process for locally modifying the surface of aluminum.

As shown in FIG. 1, on the surface of an aluminum alloy sheet 1 to be surface-modified, a round rod-shaped probe 2, which does not have a probe pin, which is inserted into the sheet 1, is moved in contact with the sheet surface at a constant pressure while rotating at high speed to generate suitable friction heat, so as to form a locally surface-modified region 3. At this time, the material of the surface of the aluminum alloy sheet 1 coming into contact with the round rod-shaped probe 2 is softened due to friction heat and processing heat caused by plastic deformation, and severe plastic flow resulting from the high-speed rotation of the round rod-shaped probe 2 penetrates into the aluminum alloy sheet 1. The width of the plastic region 4 is approximately equal to the diameter of the round rod-shaped probe 2 just below the round-rod probe, i.e., at the surface of the aluminum alloy sheet 1, but gradually decreases toward the inside of the sheet material. In this process, the plastic region 4 formed in the sheet will have a microstructure and mechanical properties different from those of the parent metal. The aluminum alloy sheet, which was locally surface-modified as described above, has improved formability compared to that of the parent metal, and when local surface modification is performed on a region at which a fracture can occur due to the concentration of strains and stresses during the formation of a product, the product can be formed more easily.

As the diameter of the round rod-shaped probe 2 is increased, the width of the locally surface-modified region 3 and the depth of the plastic region 4 increases. However, in some cases, there can be a need to increase the depth of the plastic region 4 using the same diameter of the round rod-shaped probe 2. In this case, when the friction coefficient between the aluminum alloy sheet 1 and the round rod-shaped probe 2 is high, plastic flow easily occurs, thus increasing the depth of the plastic region. Thus, when a friction portion having various shapes of fine embossments or fine protrusions is formed on the lower surface of the round rod-shaped probe 2 coming into contact with the aluminum alloy sheet 1 in order to increase the friction coefficient of the round rod-shaped probe 2, the depth of the plastic region can be easily increased. On the other hand, when the friction coefficient of the friction portion is reduced, the depth of the plastic region can be decreased.

In summary, as shown in FIG. 1, the inventive method for locally modifying the aluminum alloy sheet to improve the formability thereof comprises the steps of:

(a) firmly fixing the sheet to be locally surface-modified;

(b) positioning the high-speed rotating, round rod-shaped probe, made of a material stronger than the sheet, on a region of the sheet in need of local surface modification;

(c) generating friction heat by rotating the probe at high speed and, at the same time, causing a forced and severe plastic flow on the surface of the sheet;

(d) causing the plastic flow occurring on the sheet surface to penetrate into the sheet;

(e) forming a locally surface-modified region as a result of the movement of the probe.

EXAMPLE

In the present invention, for the comparison of formability between a parent metal and a locally surface-modified sheet, a limited dome height (LDH) test, which is a method of evaluating formability, was carried out. The LDH test was carried out on a specimen having a length of 210 mm and a width of 120 mm in conditions of punch diameter of 100.0 mm, punch speed of 2.0 mm/min, blank pressure of 60 kN and lubricant-free condition. A locally surface-modified region was formed parallel to the rolling direction of the sheet and the longitudinal direction of the specimen using tools having various diameters.

Figure 2:
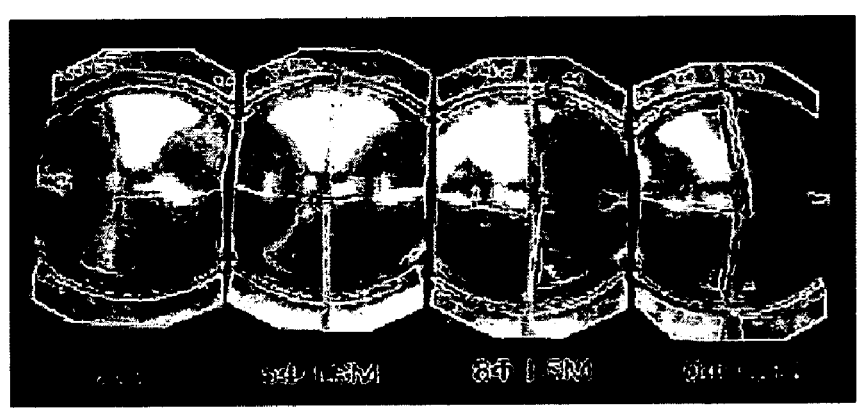
FIG. 2 shows the appearance of 1.5-mm thick 5052 aluminum alloy sheets (parent metal and locally surface-modified sheets) after being subjected to a limited dome height (LDH) test.

FIG. 2 shows the appearance of a 1.5-mm thick 5052 aluminum alloy parent metal and locally surface-modified sheets after being subjected to an LDH test. In FIG. 2, AR indicates the parent metal, and 5Φ LSM (locally surface-modified), 8Φ LSM and 10Φ LSM sheets indicate the sheets subjected to local surface modification using round rod-shaped probes having diameters of 5.0 mm, 8.0 mm and 10.0 mm, respectively. These indications are also applied in FIGS. 3 and 4 in the same manner.

Figure 3:
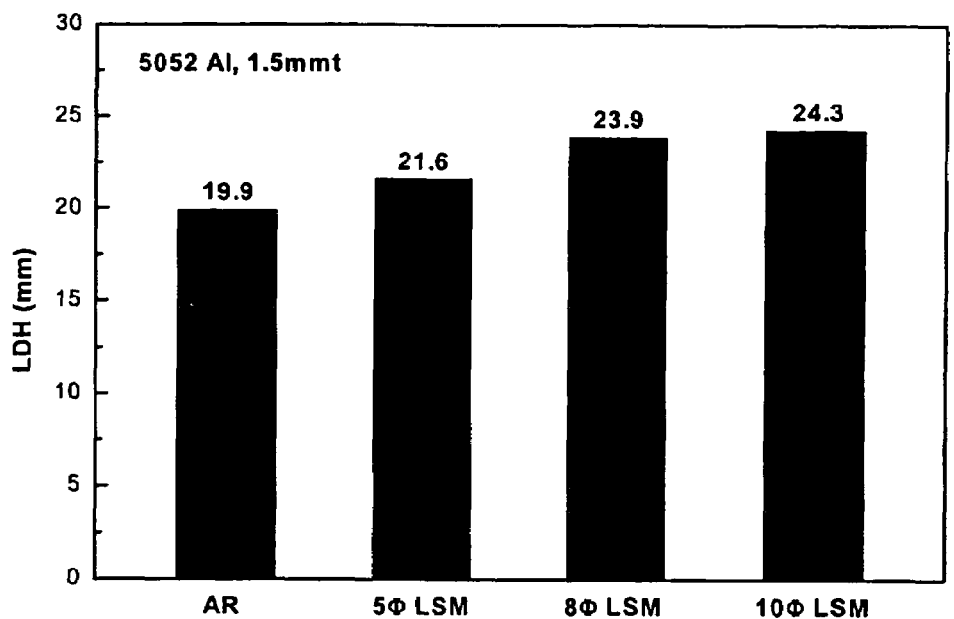
FIG. 3 shows the LDH values of 1.5-mm thick 5052 aluminum sheets (parent metal and locally surface-modified sheet)

FIG. 3 shows the comparison of LDH value between a 1.5-mm thick 5052 aluminum alloy parent metal and locally surface-modified sheets. As can be seen in FIG. 3, the LDH values of the locally surface-modified LSM sheets were higher than that of the parent metal AR sheet, and as the diameter of the round rod-shaped probe used for local surface modification increased, the LDH value increased. This indicates that the formability of the sheets can be improved by performing local surface modification using the round rod-shaped probe. The 10Φ LSM sheet showed an increase of about 22% in formability compared to the AR sheet.

Figure 4:
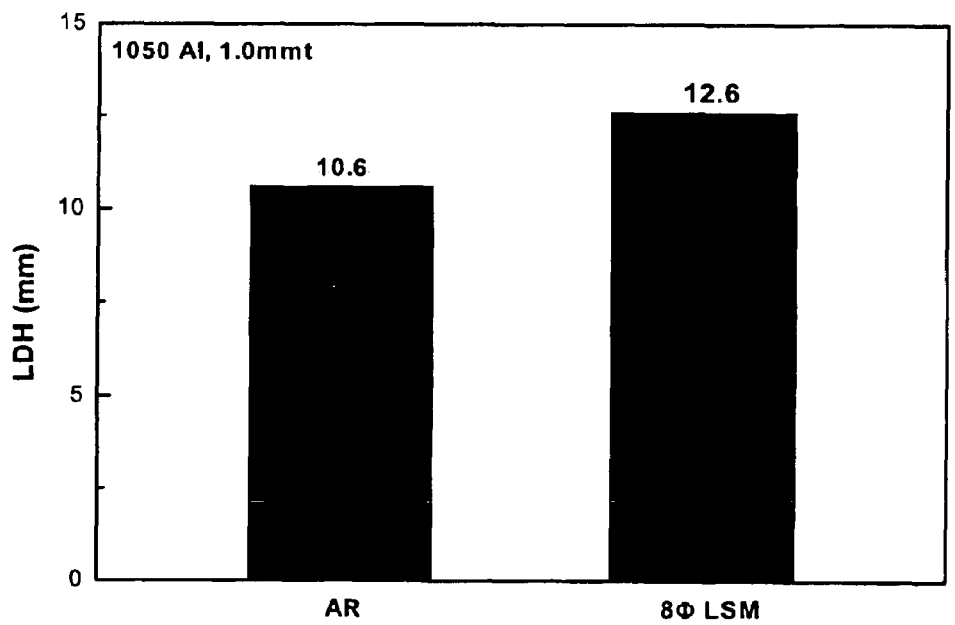
FIG. 4 shows the LDH values of 1.0-mm thick 1050 aluminum sheets (parent metal and locally surface-modified sheet)

FIG. 4 shows the comparison of the LDH value between a 1.0-mm thick 1050 aluminum alloy parent metal and a locally surface-modified sheet. As can be seen in FIG. 4, the LDH value of the LSM (locally surface-modified) sheet was higher than that of the parent metal AR (AS-received) sheet. This indicates that the formability of the sheet can be improved by performing local surface modification using the round rod-shaped probe in the same manner as the 5052 aluminum alloy sheet of FIG. 3. The 8Φ LSM sheet showed an increase of about 19% in formability compared to the AR sheet.

Figure 5:
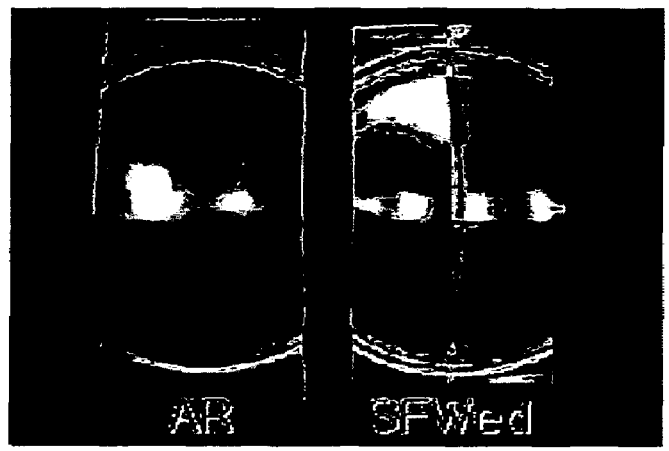
FIG. 5 shows the appearance of 0.5-mm thick 5052 aluminum alloy sheets (parent metal and surface friction-welded sheet) after being subjected to a limited dome height (LDH) test.

FIG. 5 shows the appearance of a 0.5-mm thick 5052 aluminum alloy parent metal and a surface friction-welded joint after being subjected to the LDH test. In FIG. 5, SFwed indicates a surface friction-welded joint. The tool used for the welding process had a diameter of 5 mm.

Figure 6:
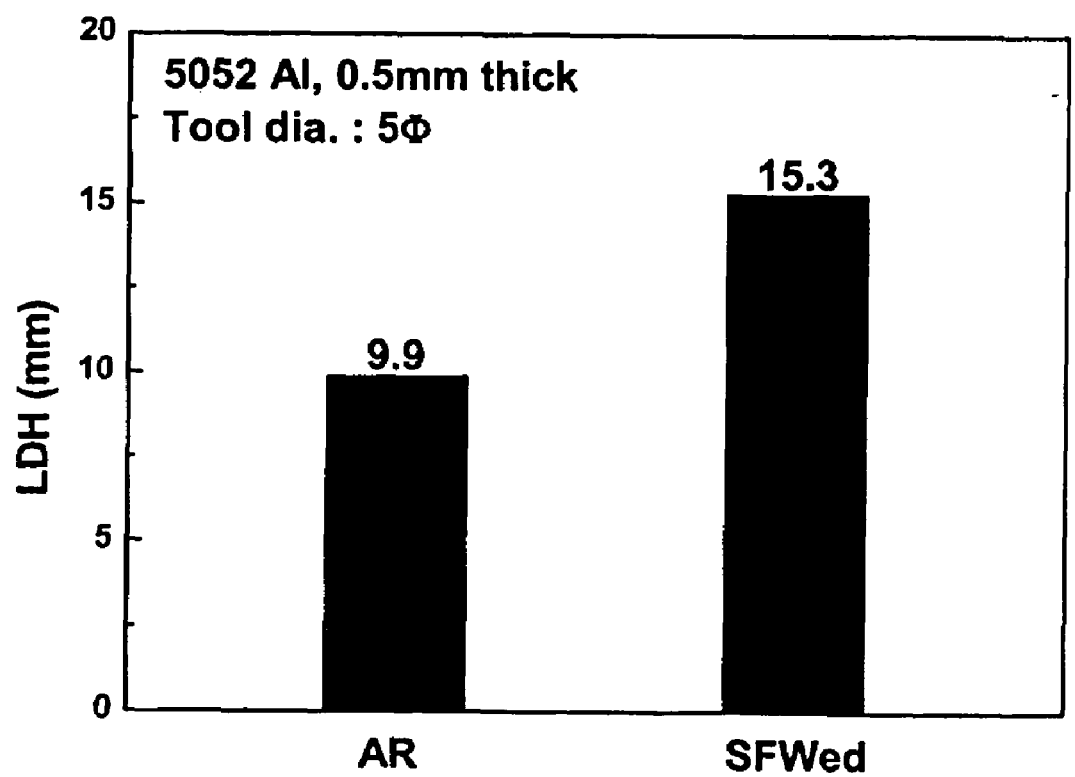
FIG. 6 shows the LDH values of 0.5-mm thick 5052 aluminum sheets (parent metal and surface friction-welded sheet).

FIG. 6 shows the comparison of LDH value between a 0.5-mm thick 5052 aluminum alloy parent metal and a surface friction-welded joint. As can be seen in FIG. 6, the LDH value of the SFWed (surface friction-welded) sheet was higher than that of the parent metal AR sheet. The surface friction-welded SFWed sheet showed an increase of about 50% in formability compared to the parent metal AR sheet.

As described above, according to the present invention, when the round rod-shaped probe is moved in contact with the aluminum alloy sheet by the application of pressure while rotating at high speed, the local region of the aluminum alloy sheet is changed to have a microstructure and mechanical properties different from those of the parent metal due to dynamic recrystallization, grain refinement and the like, resulting from an increase in temperature and continuous plastic deformation inside of the aluminum alloy sheet at the interface between the sheet and the round rod-shaped probe due to the rotation of the round rod-shaped probe. Also, as the round rod-shaped probe rotates, plastic flow penetrates into the aluminum so as to form a surface-modified plastic region along the movement pathway of the round rod-shaped probe, such that the formability of the aluminum alloy sheet can be improved due to the microstructure and mechanical properties of the surface-modified plastic region.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for locally modifying the surface of an aluminum alloy sheet to improve the formability thereof, the method comprising:

a sheet fixing step of fixing a sheet to be locally surface-modified;

a surface modification-needing region detection step of detecting a region on which strains and stresses are to be concentrated during formation of the sheet into a product;

a probe positioning step of positioning a high-speed rotation probe on the region detected in said detection step wherein the probe is a round rod-shaped probe, which does not have a probe pin, which is inserted into the sheet; and a surface modification step compromising bringing the high-speed rotating probe into close contact with the surface modification-needing region and then moving the contacted probe on the region by the application of pressure.

2. The method of claim 1, wherein the probe has a friction portion formed on the lower end surface thereof.

3. The method of claim 1, wherein said surface-modified region of the sheet is a joint formed by joining two or more sheets to each other using a surface friction welding process.

* * * * *